(12) United States Patent
Jarry et al.

(10) Patent No.: US 12,502,648 B2
(45) Date of Patent: Dec. 23, 2025

(54) WET CONCRETE CONDITIONING

(71) Applicant: L'Air Liquide, Société Anonyme pour l'Etude et l'Exploitation des Procédés Georges Claude, Paris (FR)

(72) Inventors: Luc Jarry, Malakoff (FR); Shashwat Bandyo, Singapore (SG)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 706 days.

(21) Appl. No.: 17/799,383

(22) PCT Filed: Jan. 29, 2021

(86) PCT No.: PCT/EP2021/052083
§ 371 (c)(1),
(2) Date: Aug. 12, 2022

(87) PCT Pub. No.: WO2021/160443
PCT Pub. Date: Aug. 19, 2021

(65) Prior Publication Data
US 2023/0082457 A1    Mar. 16, 2023

(30) Foreign Application Priority Data
Feb. 13, 2020    (EP) .................................. 20305135

(51) Int. Cl.
*B01F 29/00*    (2022.01)
*B01F 29/60*    (2022.01)
(Continued)

(52) U.S. Cl.
CPC ............ *B01F 29/60* (2022.01); *B01F 33/502* (2022.01); *B01F 35/91* (2022.01); *B01F 2035/98* (2022.01)

(58) Field of Classification Search
CPC ........ B01F 29/60; B01F 35/91; B01F 33/502; B01F 2035/98
See application file for complete search history.

(56) References Cited

U.S. PATENT DOCUMENTS

| | | | |
|---|---|---|---|
| 3,583,172 A | 6/1971 | Koudelka | |
| 6,279,328 B1 | 8/2001 | Leeds | |
| (Continued) | | | |

FOREIGN PATENT DOCUMENTS

| | | |
|---|---|---|
| EP | 0 041 702 | 12/1981 |
| EP | 2 142 862 | 7/2019 |
| (Continued) | | |

OTHER PUBLICATIONS

International Search Report and Written Opinion for corresponding PCT/EP2021/052083, May 19, 2021.

*Primary Examiner* — Anshu Bhatia
(74) *Attorney, Agent, or Firm* — Elwood L. Haynes

(57) ABSTRACT

Method and equipment for conditioning wet concrete (703), the wet concrete (703) being agitated in a revolving-drum concrete mixer (702), thereby bringing changing portions of the wet concrete (703) to a free surface (706) of the wet concrete (703) inside the mixer (702), the agitated wet concrete (703) being cooled and partially carbonated in that liquid and/or solid carbon dioxide is supplied to the concrete mixer (702) simultaneously with liquid nitrogen so that both the supplied nitrogen and the supplied carbon dioxide contact the free surface (706) of the wet concrete (703).

9 Claims, 3 Drawing Sheets

(51) Int. Cl.
    *B01F 33/502*   (2022.01)
    *B01F 35/91*    (2022.01)
    *B01F 35/90*    (2022.01)

(56)            References Cited

U.S. PATENT DOCUMENTS

| | | |
|---|---|---|
| 10,293,297 B2 | 5/2019 | Baxter et al. |
| 2012/0255315 A1 | 10/2012 | Cousin et al. |
| 2014/0216303 A1 | 8/2014 | Lee et al. |
| 2014/0373755 A1 | 12/2014 | Forgeron et al. |
| 2015/0232381 A1* | 8/2015 | Niven .................... B28C 7/024 |
| | | 106/709 |
| 2018/0238619 A1 | 8/2018 | Baxter et al. |
| 2018/0252469 A1 | 9/2018 | Baxter et al. |

FOREIGN PATENT DOCUMENTS

| | | |
|---|---|---|
| EP | 3 865 202 | 8/2021 |
| JP | S61 201681 | 9/1986 |
| JP | H04 254662 | 9/1992 |
| JP | 2010 207729 | 9/2010 |
| WO | WO 00 36351 | 6/2000 |
| WO | WO 2006 100550 | 9/2006 |
| WO | WO 2015 154174 | 10/2015 |
| WO | WO 2018 136628 | 7/2018 |

* cited by examiner

WET CONCRETE CONDITIONING

CROSS REFERENCE TO RELATED APPLICATIONS

This application is a 371 of International Application Na PCT/EP2021/052083, filed Jan. 29, 2021, which claims priority to European Patent Application No. 20305135.4, filed Feb. 13, 2020, the entire contents of which are incorporated herein by reference.

BACKGROUND

The present invention relates to the conditioning of wet concrete.

The setting temperature of wet concrete has a significant effect on the properties, in particular strength, of the setting and the set concrete, Heating up of the wet concrete may also cause slump loss, cracks in the set concrete, in particular plastic shrinkage cracks and/or thermal stress cracks, delayed ettringite formation and/or reduced workability of the wet concrete.

When the environmental temperatures are high, it is often necessary to cool the wet concrete prior to casting in order to lower the setting temperature.

One known method of cooling wet concrete is to cool the process water used for preparing the wet concrete, i.e. to cool the water which is mixed with the dry solid ingredients of the wet concrete.

It is, for example known from EP-A-2142862 to use a suspension of small ice particles in water as process water in the preparation of a wet concrete.

Whereas this method is effective for lowering the temperature of the freshly prepared wet concrete, it is not suited for cooling wet concrete at a later stage, for example during transport or on-site after transport, as the addition of additional ice/water suspension would result in a dilution of the wet concrete.

As, for example, described in U.S. Pat. No. 3,583,172 and WO-A-2006/100550, it was also known to cool wet concrete inside a rotating mixer drum, such as the rotating mixer drum of a transport truck, by injecting a cooling fluid, in particular a cryogenic cooling fluid, directly into the mixer drum and in contact with the wet concrete. According to U.S. Pat. No. 3,583,172 and WO-A-2006/100550, the cooling fluid may be chilled water, as well as liquid air, nitrogen, helium, neon, argon, oxygen or carbon dioxide.

The cryogenic fluid most commonly used for cooling wet concrete is liquid nitrogen. It presents the major advantages of being widely available at relatively low cost and of being chemically inert with respect to the wet concrete. In other words, when liquid nitrogen is used to cool wet concrete, the only effects on the properties of the setting and the set concrete are those due to the lower wet concrete temperature.

The use of liquid air, helium, neon, argon or oxygen for wet-concrete cooling is typically not cost effective.

Carbon dioxide is increasingly available at low cost, but reacts chemically with wet concrete in an exothermic reaction known as carbonation.

Partial carbonation of wet concrete by bringing wet concrete in contact with carbon dioxide has been proposed as a method for capturing carbon dioxide in order to reduce (industrial) carbon dioxide emissions into the atmosphere. Indeed, the carbon dioxide which has thus chemically reacted with the wet concrete, remains in the concrete during and after setting.

As explained in US-A-2014373755, carbonation of wet concrete may affect flowability and moisture characteristics of the wet concrete, early strength development, as well as the compactability and thus the final strength of the set concrete.

The total amount of carbon dioxide, with which the wet concrete may be contacted and reacted, is thus limited by the properties of the wet concrete and of the set concrete required under the circumstances. Said amount must therefore be monitored.

Due to the exothermic carbonation reaction, carbon dioxide was in practice not considered suitable for use as a cooling medium in direct contact with wet concrete.

US-A-2014373755 teaches to effect carbonation of wet concrete with carbon dioxide followed by cooling of the carbonated wet concrete with ice or liquid nitrogen.

The preparation, transport, supply and casting of wet concrete is often under significant time pressure, both for logistical and technical reasons.

The additional delay caused by the implementation of an exothermic carbonation step followed by a cooling step, as proposed in US-A-2014373755, will, in many instances, be considered problematic and may cause bottlenecks in the wet-concrete supply process or in the downstream concrete casting process, in particular in the case of large construction processes.

SUMMARY

The aim of the present invention is to provide an improved method for the conditioning of wet concrete and equipment for same.

The aim of the present invention is in particular to provide an improved method, whereby wet concrete can be cooled rapidly and whereby the wet concrete is partially carbonated in a controlled manner.

A further aim of the present invention is to contribute to the reduction of industrial carbon dioxide emissions into the atmosphere.

Thereto, the present invention provides a method for conditioning wet concrete. According to the invention, wet concrete is agitated in a revolving-drum concrete mixer. Such agitation causes changing portions of the wet concrete to be brought to the free surface of the wet concrete inside the mixer. While the wet concrete is thus agitated by and inside the revolving-drum concrete mixer, nitrogen is supplied to the mixer in liquid form, whereupon, in a manner known per se, the supplied nitrogen contacts the wet concrete at its free surface and thereby cools the wet concrete.

The conditioning method according to the present invention differs from the known method of cooling wet concrete with liquid nitrogen in that the agitated wet concrete is both cooled and partially carbonated in that liquid and/or solid carbon dioxide is supplied to the concrete mixer simultaneously with the nitrogen so that both the supplied nitrogen and the supplied carbon dioxide contact the free surface of the wet concrete.

The method of the present invention has a number of advantages.

The liquid and/or solid carbon dioxide, on the one hand, extracts heat from the wet concrete and therefore de facto acts as a cooling agent, while, on the other hand, causing the temperature of the wet concrete to rise because of the exothermic carbonation reaction.

By combining the use of carbon dioxide and liquid nitrogen and by regulating the corresponding carbon-dioxide to nitrogen ratio, the degree of carbonation and the temperature rise caused thereby can be better controlled and the changes in the properties (such as moisture characteristics and strength) of the concrete associated with carbonation are reduced and controlled compared to the treatment of the wet concrete with carbon dioxide as such, whether for the purpose of partial carbonation or for cooling.

In the present context, the term "cooling", as used in connection with the "cooling" of the wet concrete, refers to the extraction of thermal energy from said wet concrete. Depending on the presence of other sources of thermal energy, such as, in particular, the exothermal carbonation reaction, but also friction, during agitation, between the wet concrete and the mixer and within the wet concrete itself, ambient temperatures and heat radiation, the "cooling" of the wet concrete may result in a lowering of the temperature of the wet concrete or the prevention or reduction of a temperature rise of the wet concrete.

In addition, as will be clarified hereafter, when sufficient carbonation of the wet concrete has taken place, cooling of the wet concrete can be continued using only nitrogen as the cooling agent. Naturally, such a nitrogen-only cooling step may also precede the carbonation-cooling of the wet concrete with a combination of nitrogen and carbon dioxide in order to adjust the temperature of the wet concrete at the start of the combined carbonation-cooling step. Compared to known processes, whereby carbonation with carbon dioxide and cooling with a cryogenic fluid take place in subsequent steps, the temperature of the wet concrete during the partial carbonation is better controlled, partial carbonation and cooling to the required temperature are achieved in a shorter period of time and the same installation may thus be used both for partial carbonation and cooling.

Due to its greater cooling capacity, the liquid nitrogen is preferably subcooled liquid nitrogen.

For the same reason, the carbon dioxide is preferably solid carbon dioxide and in particular solid carbon dioxide which has been cooled to below its solidification/desublimation temperature, i.e. supercooled solid carbon dioxide. Thus, when solid carbon dioxide, and in particular supercooled solid carbon dioxide is supplied to the concrete mixer, the amount of liquid nitrogen to be supplied to the mixer for cooling purposes may correspondingly be reduced.

It may be noted that not all of the carbon dioxide supplied to the concrete mixer necessarily takes part in the carbonation reaction, and that part of the carbon dioxide may be evacuated from the concrete mixer in gaseous form together with the nitrogen. However, for the purpose of reducing carbon dioxide emissions into the atmosphere, the weight ratio of carbon dioxide to liquid nitrogen is preferably selected so as to maximize the portion of the carbon dioxide supplied to the mixer which is effectively captured by the wet concrete and remains in the set concrete and thus to minimize the portion of the supplied carbon dioxide which is evacuated from the mixer in gaseous form.

The carbon dioxide supplied to the mixer is preferably dispersed in the nitrogen which is supplied to concrete mixer. By thus dispersing the carbon dioxide in the nitrogen before the carbon dioxide is brought into contact with the free surface of the wet concrete, contact between the carbon dioxide and the wet concrete is spread over a larger area of the free surface of the wet concrete so that the carbonation reaction is more evenly distributed in the wet carbon. It is thereby avoided that the wet concrete presents localized high degrees of carbonation, which may in turn result in inhomogeneous properties of the set concrete.

According to one embodiment, the carbon dioxide and the nitrogen are supplied together to the mixer, the liquid and/or solid carbon dioxide being dispersed in the nitrogen which is supplied to concrete mixer.

For example, the liquid and/or solid carbon dioxide may be dispersed in the liquid nitrogen before the liquid nitrogen is supplied to concrete mixer.

According to one such embodiment, the liquid nitrogen containing liquid and/or solid carbon dioxide dispersed therein is poured into the concrete mixer and onto the free surface of the wet concrete. It was found in particular that such a mixture of liquid nitrogen with solid carbon dioxide dispersed therein (i.e. in the form of solid carbon dioxide particles) blends easier and quicker with the wet concrete than liquid nitrogen which does not contain particulate solid carbon dioxide.

According to a further such embodiment, a flow of the liquid nitrogen containing liquid and/or solid carbon dioxide dispersed therein is supplied to a nitrogen injector. Said nitrogen injector injects said flow into the concrete mixer in one or more streams, which contact the free surface of the wet concrete. The nitrogen preferably injects the mixture of liquid nitrogen and liquid and/or solid carbon dioxide into the mixer in a single stream.

The mixture of liquid nitrogen with liquid and/or solid carbon dioxide dispersed therein may be prepared elsewhere and then transported to the location where the wet concrete is (to be) conditioned. Alternatively, such a mixture can also be prepared at the location where the wet concrete is to be conditioned. The mixture may be prepared beforehand or immediately before being used in the conditioning of the wet concrete.

The method according to the present invention may advantageously be used in combination with the method described in co-pending patent application EP20305134.

Such mixtures may be stored and/or transported in cryogenic tanks or canisters. For example, when such a mixture is poured onto the free surface of the wet concrete fin the mixer, cryogenic canisters with a 30-40 l capacity may be used.

The carbon-dioxide to nitrogen weight ratio of the mixture can vary widely, depending on the carbonation and cooling sought. For example the carbon-dioxide to nitrogen weight ratio may be as low as of the order of 1%.

Such a mixture of liquid nitrogen with liquid and/or solid carbon dioxide dispersed therein may advantageously present a carbon-dioxide to nitrogen weight ratio between 10 and 50%. Such a suspension typically has the consistency of cow milk. Alternatively, the carbon-dioxide content of the suspension may have a carbon-dioxide to nitrogen weight ratio greater than 50%, but of at most 70% and have a more cream-like consistency. In the latter case, some carbon dioxide particles were found to show a tendency to precipitate from the suspension and/or for the suspension to become non-homogeneous/layered. Consequently, it may be useful for the suspension to be agitated/homogenized by means of an agitating system before being supplied to the mixer and/or for a dispersing agent to be present in the suspension.

The use of a mixture of liquid nitrogen and solid carbon dioxide particles has been described in the state of the art, but only as a coolant, i.e. in processes whereby the material being cooled is chemically inert with respect to both the nitrogen and the carbon dioxide. As explained above, this is not the case for wet concrete, which undergoes a carbonation reaction in contact with $CO_2$.

Alternatively, the liquid nitrogen, on the one hand, and the liquid and/or solid carbon dioxide, on the other hand, may be supplied to the concrete mixer simultaneously, but separately.

For the reasons indicated above, in that case as well, it is preferred that the supplied carbon dioxide is dispersed in the supplied nitrogen inside the mixer before the carbon dioxide contacts the free surface of the wet concrete.

According to one such embodiment, the liquid nitrogen is supplied to a nitrogen injector, which injects said nitrogen into the concrete mixer in one or more nitrogen streams which contact the free surface of the wet concrete. The liquid and/or solid carbon dioxide is supplied to the mixer separately from the liquid nitrogen, but in such a way that the carbon dioxide is thereafter dispersed in at least one of the one or more injected nitrogen streams. The liquid and/or solid carbon dioxide may be supplied to the concrete mixer as one or more carbon-dioxide streams, which are injected by means of a carbon-dioxide injector. The thus injected liquid and/or solid carbon dioxide is thereafter dispersed in at least one of the one or more injected nitrogen streams, for example because the carbon dioxide stream(s) is/are intersected by a nitrogen stream inside the concrete mixer, causing the carbon dioxide to be dispersed in the nitrogen of the intersecting nitrogen stream.

Alternatively, the one or more carbon-dioxide streams or at least one of the one or more carbon-dioxide streams may be injected into the concrete mixer in contact with at least one of the one or more nitrogen streams, whereby the carbon dioxide is dispersed in the nitrogen of said at least one nitrogen stream. In that case, the one or more carbon-dioxide streams or at least one of the one or more carbon-dioxide streams are/is preferably injected into the concrete mixer via a carbon-dioxide injector, which is surrounded by a nitrogen injector through which nitrogen is injected around and in contact with the carbon dioxide stream from the carbon-dioxide injector so that said carbon-dioxide is dispersed in the surrounding nitrogen stream. According to a further preferred embodiment, the one or more carbon-dioxide streams or at least one of the one or more carbon-dioxide streams are/is injected into the concrete mixer via a carbon-dioxide injector, which surrounds a nitrogen injector through which nitrogen is injected surrounded by and in contact with the carbon dioxide stream from the carbon-dioxide injector so that the surrounding carbon-dioxide is dispersed in said nitrogen stream. It is also possible to combine these embodiments, using, for example, a nitrogen injector surrounded by a carbon-dioxide injector, which is in turn surrounded by a further nitrogen injector.

The nitrogen is preferably injected into the concrete mixer in a single nitrogen stream, or, in the particular case described above, as two co-axial nitrogen streams. Likewise, when the carbon dioxide is injected into the concrete mixer, said carbon dioxide is preferably injected as a single carbon-dioxide stream.

As is well known by a person skilled in the art, when particles, such as solid carbon-dioxide particles, are injected in the form of one or more streams, said particles are entrained in a stream of gaseous or liquid conveyor fluid. Any reference to carbon-dioxide particle streams thus covers such fluid-entrained carbon-dioxide streams.

When carbon dioxide is injected in the form of one or more streams of particulate solid carbon dioxide, said stream or streams are preferably streams of carbon-dioxide snow. Such streams of carbon-dioxide snow are preferably produced by means of a snow horn.

The method of the present invention is particularly useful for conditioning, more specifically for cooling and partially carbonating, wet concrete in a revolving-drum concrete mixer which is mounted on a transport vehicle, in particular, but not exclusively, a concrete transport truck.

The cooling and partial carbonation of the wet concrete may in particular be performed before the wet concrete is to be transported, between two transport stages of the wet concrete, or at a location where the wet concrete is to be cast to form a set concrete product.

As explained earlier, it is possible to limit the degree of carbonation of the wet concrete in that the process for conditioning the wet concrete comprises at least two parts or phases. During part of the process, the wet concrete is conditioned by means of the method as described above whereby a combination of nitrogen and carbon dioxide is supplied simultaneously. During a different part of the process the wet concrete is cooled by supplying nitrogen in liquid form to the concrete mixer without carbon dioxide being supplied to the concrete mixer, so that, during said part of the process, the wet concrete is cooled, but no carbonation of the wet concrete with carbon dioxide takes place. For example, during part of the process, a flow of liquid nitrogen containing liquid and/or solid carbon dioxide dispersed therein is supplied to a nitrogen injector, which injects said flow into the concrete mixer, and, in a further part of the process, a flow of liquid nitrogen in which no carbon dioxide is dispersed is supplied to said nitrogen injector and thereby injected into the concrete mixer. When, for example, different injectors are used, on the one hand, for the liquid nitrogen and, on the other hand, for the liquid and/or solid carbon dioxide, both said injectors are used to inject the respective media during part of the process and only the nitrogen injector is used during a further part of the process, during which only nitrogen is injected into the mixer. Such a process is of particular interest when the amount of heat to be withdrawn from the wet concrete (degree of cooling) is important. By means of the described process, carbonation of the wet concrete by means of the carbon dioxide can be kept within desired limits, while the desired degree of cooling can be achieved in a short period of time.

The present invention also relates to an installation for conditioning wet concrete, which is adapted for use in the described method and process.

According to one embodiment, such an installation comprises a revolving-drum concrete mixer for agitating wet concrete. The concrete mixer has a revolution axis and typically presents a mouth at one end of the axis. The mixer may have a horizontal axis, an axis which is upwardly inclined towards the mouth of the mixer or an axis of which the orientation may be varied. The installation further comprises equipment for supplying a fluid to the concrete mixer through its mouth in a controlled amount and/or at a controlled flow-rate. Said equipment includes a source of the fluid to be supplied to the concrete mixer, said source being, in accordance with one embodiment of the present invention, a source of liquid and/or solid carbon dioxide dispersed in liquid nitrogen. The equipment then typically comprises an injector, which is fluidly connected to the source by means of a conduit, and which is adapted for the injection of the fluid, i.e. of the liquid and/or solid carbon dioxide dispersed in liquid nitrogen, in one or more streams into the concrete mixer in said controlled amount and/or at said controlled flow-rate.

In the present context, a "source" of a medium refers to equipment adapted to supply the specifically mentioned medium. For example, a source of liquid nitrogen may be a reservoir containing liquid nitrogen, a pipeline supplying liquid nitrogen, a nitrogen liquefier, an Air Separation Unit with a liquid nitrogen outlet, etc.

An installation of the type described above preferably also contains a source of liquid nitrogen per se, i.e. without admixed carbon dioxide, which is equally connected to the injector, thereby making it possible to switch between the injection of carbon-dioxide-containing liquid nitrogen and the injection of liquid nitrogen per se into the concrete mixer, as described earlier.

According to an alternative embodiment, the installation again comprises a revolving-drum concrete mixer and equipment for introducing fluid into the concrete mixer via its mouth, said equipment comprising an injector for injecting the fluid in one or more streams in a controlled amount and/or at a controlled flow-rate into the concrete mixer. According to this embodiment, the equipment comprises a source of liquid nitrogen, i.e. a source of liquid nitrogen in which no liquid or solid carbon dioxide is dispersed, which is fluidly connected to the injector by means of a nitrogen conduit.

The equipment further comprises a source of liquid and/or particulate solid carbon dioxide. Said source of liquid and/or particulate solid carbon dioxide is fluidly connected to the nitrogen conduit by means of a connector, which is adapted to introduce liquid and/or solid carbon dioxide into the nitrogen conduit in a controlled amount and/or at a controlled flow rate and this upstream of the injector.

Thus, when the connector is used to add carbon dioxide to the flow of liquid nitrogen in the nitrogen conduit, the injector injects a mixture of nitrogen and carbon dioxide into the concrete mixer, whereas, when no carbon dioxide is added to the flow of liquid nitrogen by means of the connector, the injector injects only nitrogen into the concrete mixer.

According to a further embodiment of the installation of the present invention, the installation again comprises a revolving-drum concrete mixer and equipment for introducing fluid into the concrete mixer via its mouth. In this particular case, said equipment comprises a nitrogen injector and a source of liquid nitrogen, as well as a carbon-dioxide injector and a source of liquid and/or particulate solid carbon dioxide.

The nitrogen injector is adapted for the injection of nitrogen in one or more streams into the concrete mixer in a controlled amount and/or at a controlled flow-rate. The nitrogen injector is fluidly connected to the source of liquid nitrogen by means of a nitrogen conduit.

The carbon-dioxide injector is adapted for the injection of liquid and/or particulate solid carbon dioxide in one or more streams into the concrete mixer in a controlled amount and/or at a controlled flow-rate. The carbon-dioxide injector is thereto fluidly connected to the source of liquid and/or particulate solid carbon dioxide by means of a carbon-dioxide conduit.

According to one such embodiment, the nitrogen injector and the carbon-dioxide injector are positioned with respect to one another so that, inside the concrete mixer, the carbon dioxide injected by the carbon-dioxide injector is contacted by and dispersed in at least one of the one or more nitrogen streams injected by the nitrogen injector. For example, the carbon-dioxide injector may inject the carbon dioxide into the mixer in a carbon-dioxide stream having a direction which forms an angle with at least one nitrogen stream so that the carbon-dioxide stream is intersected by said nitrogen stream downstream of the two injectors, thereby causing the carbon dioxide of the carbon-dioxide stream to be dispersed in the nitrogen stream.

According to another such embodiment, the nitrogen injector and the carbon-dioxide injector are positioned with respect to one another so that the carbon dioxide is injected into the concrete mixer in contact with the nitrogen stream or with at least one of the multiple nitrogen streams, whereupon the injected carbon dioxide is dispersed in the nitrogen stream or in at least one of the nitrogen streams. Thereto, the respective injection nozzles of the nitrogen and of the carbon-dioxide injectors may, for example, be positioned adjacent to one another. According to a preferred embodiment, the carbon-dioxide injector is surrounded by the nitrogen injector or vice versa. Another possible embodiment is the surrounding arrangement of one carbon-dioxide injector and two nitrogen injectors as described earlier. In these cases, the injection nozzle of the carbon-dioxide injector and of the nitrogen injector(s) may be located in a same plane. Alternatively, the injection nozzle of the carbon-dioxide injector may be positioned upstream of or downstream of the injection nozzle of the nitrogen injector or, in the case of two nitrogen injectors, upstream or downstream of the injection nozzle of one or both said nitrogen injectors.

Thus when both the nitrogen injector(s) and the carbon-dioxide injector are active, nitrogen and carbon dioxide are injected into the concrete mixer for cooling and partial carbonation, the carbon dioxide being dispersed in the injected nitrogen. When only the nitrogen injector is active, or when only one or both of the two nitrogen injectors are active, only nitrogen is injected into the concrete mixer for cooling purposes only.

As indicated earlier, when the installation comprises a carbon-dioxide injector, said carbon-dioxide injector is advantageously a snow horn.

As also indicated earlier, the revolving-drum concrete mixer may be mounted on a transport vehicle.

The above installations according to the present invention preferably also comprise a regulator adapted to regulate (a) the amount and/or the flow rate of liquid nitrogen introduced into the concrete mixer and (b) the amount and/or the flow rate of liquid and/or particulate solid carbon dioxide introduced into the concrete. Naturally, when a source of liquid and/or solid carbon dioxide dispersed in liquid nitrogen is present, by regulating, by means of said regulator, the amount and/or the flow rate of the mixture of nitrogen and carbon dioxide flowing from said source to the concrete mixer, both (a) the amount and/or the flow rate of liquid nitrogen and (b) the amount and/or the flow rate of liquid and/or particulate solid carbon dioxide introduced into the concrete mixer are regulated simultaneously.

The installation may comprise a silo containing wet concrete and adapted to supply a controlled amount of the wet concrete to the concrete mixer, typically via the mouth of the concrete mixer.

The installation may also comprise a wet-concrete production unit adapted supply a controlled amount of the produced wet concrete to the concrete mixer, typically via the mouth of the concrete mixer.

According to a further aspect, the present invention relates to installations for injecting media into a revolving-drum concrete mixer suitable for use in the method and process of the invention, and in particular for injecting media into a revolving-drum concrete mixer which is mounted on a transport vehicle.

Such installations comprise an upwardly extending support structure on which a nitrogen injector is mounted above ground level, Examples of such upwardly extending support structures are in particular described in WO-A-2006/100550.

In one embodiment, the installation for injecting media into a revolving-drum concrete mixer according to the present invention further comprises (a) a first source of liquid nitrogen in which liquid and/or particulate solid carbon dioxide is dispersed, said first source being fluidly connected to the nitrogen injector, and optionally also (b) a second source of liquid nitrogen in which no liquid or solid carbon dioxide has been dispersed, said second source being then likewise fluidly connected to the nitrogen injector. The installation further comprises a control unit adapted (i) to control an amount and/or a flow rate of liquid nitrogen in which liquid and/or particulate solid carbon dioxide is dispersed flowing from the first source to the nitrogen injector, and optionally, when the installation also comprises the second source, (ii) to control an amount or a flow rate of liquid nitrogen flowing from the second source to the nitrogen injector.

According to a further embodiment, the installation comprises, in addition to the upwardly extending support structure and the nitrogen injector mounted on said support structure; (a) a first source of liquid nitrogen in which no liquid or solid carbon dioxide has been dispersed, said first source being fluidly connected to the nitrogen injector by means of a nitrogen conduit, and also (b) a second source of liquid and/or particulate solid carbon dioxide, said second source being fluidly connected to the nitrogen conduit by means of a connector.

In that case, said installation further comprises a control unit adapted to control (i) a first amount and/or a first flow rate of liquid nitrogen form the first source flowing through the nitrogen conduit to the nitrogen injector, and (b) a second amount and/or a second flow rate of liquid and/or particulate solid carbon dioxide from the second source flowing into the nitrogen conduit via the connector.

According to another embodiment, the installation for injecting media into a concrete mixer comprises an upwardly extending support structure having an injector unit mounted on thereon above ground level. The injector unit in turn comprises a nitrogen injector and a carbon-dioxide injector. A first source of liquid nitrogen in which no liquid or solid carbon dioxide has been dispersed, is fluidly connected to the nitrogen injector by means of a nitrogen conduit, referred to as the "first conduit". A second source, this time of liquid and/or particulate solid carbon dioxide, is fluidly connected to the carbon-dioxide injector by means of a carbon-dioxide conduit, referred to as "second conduit".

The installation further comprises a control unit. Said control unit is adapted to control, on the one hand, a first amount and/or a first flow rate of liquid nitrogen which flows from the first source to the nitrogen injector via the first conduit and, on the other hand, a second amount or a second flow rate of liquid and/or particulate solid carbon dioxide which flows from the second source to the carbon-dioxide injector via the second conduit.

As previously discussed, when the installation comprises both a nitrogen injector and a carbon-dioxide injector:
the nitrogen injector and the carbon-dioxide injector may be positioned with respect to one another so that, when nitrogen is injected by means of the nitrogen injector and carbon dioxide is simultaneously injected by the carbon-dioxide injector, the injected carbon dioxide is contacted by and dispersed in at least part of the injected nitrogen downstream of the two injectors, thereto the carbon-dioxide injector and the nitrogen injector may be positioned with respect to one another so that the nitrogen and the carbon dioxide are injected by said injectors at an angle to one another;
the nitrogen injector and the carbon-dioxide injector may be positioned with respect to one another so that, when nitrogen is injected by means of the nitrogen injector and carbon dioxide is simultaneously injected by the carbon-dioxide injector, the carbon dioxide is injected in contact with at least part of the injected nitrogen and is dispersed in said at least part of the injected nitrogen, whereby the carbon-dioxide injector may, more particularly, be surrounded by the nitrogen injector or vice versa;
the carbon-dioxide injector may be a snow horn.

The different configurations of the installations for conditioning wet concrete with both a nitrogen injector and a carbon-dioxide injector described above thus equally apply to installations for injecting media in accordance with the invention which comprise both said injectors.

The injector or injectors of the installation are advantageously movably mounted on the support structure. For example, the injector or injectors may telescope or be movable along a longitudinal axis so as to be able to reach into the inside of a concrete mixer for injection and to be extracted from the concrete mixer thereafter in the direction of said longitudinal axis. Similarly, and optionally in combination therewith, the injector or injectors may also be mounted on the support structure so that the injector(s) may be swung or rotated towards and away from a concrete mixer or a concrete mixer opening. The swinging movement may be vertical, horizontal or a combination of both.

According to a preferred embodiment, the control unit comprises a remote control for activating or deactivating the injector or injectors of the installation, i.e. for starting the injection of the corresponding medium or media through said injector(s) and for interrupting the injection of the medium or media by said injector(s).

A remote control may also be used for controlling or regulating the respective amounts and/or flow rates mentioned above.

Control units may be manually operated or automatically operated. Preferably, the control units can be both manually and automatically operated, for example with manual operation being able to override automatic operation, for example, for security reasons, or with the conditioning process being started manually, when the concrete mixer containing the wet concrete to be conditioned, is in place, the unfolding of the conditioning method or process itself being automatically controlled.

The control of the conditioning method or process may rely on previously collected data and/or on process parameters measured during the conditioning method/process itself.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
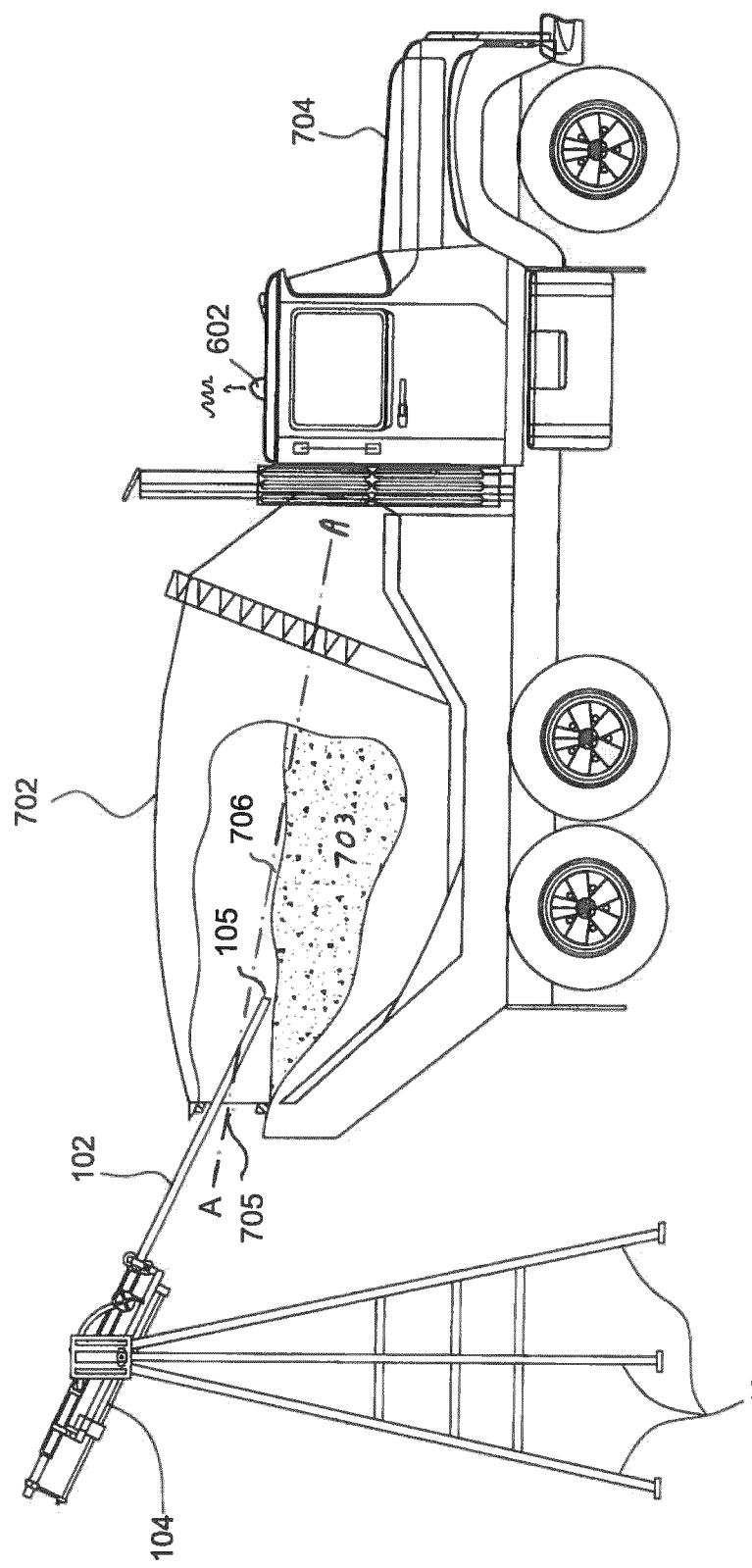
FIG. 1 is a schematic representation of a first installation for use in the present invention.

FIG. 1 shows a concrete transport truck 704 having a revolving-drum concrete mixer 702 mounted thereon. While in the drum/mixer 702, the wet concrete 703 is agitated/stirred in that mixer 702 is rotated around inclined axis A-A, thereby continuously renewing the free surface 706 of said wet concrete 703, i.e. the surface of wet concrete 703 which is exposed to the atmosphere inside mixer 702. The interior of mixer 702 is fitted with a spiral blade (not shown) in a manner known in the art. The spiral blade improves the agitation/mixing of the wet concrete 703 inside mixer 702 when the latter is rotated and, acting as an Archimedes screw, assists with the charging and discharging of the wet concrete 703. Charging and discharging of the wet concrete takes place via the mixer mouth 705 located at the upper end of axis A-A.

The installation according to the invention comprises an upwardly extending support structure 108, which extends from ground level to above the level of mixer mouth 705.

An injector unit 104 is pivotally mounted near the top of the support structure 108 so as to enable the injector unit 104 to be directed towards and away from mixer mouth 705.

Injector unit 104 further comprises an extendable lance 102. When mixer truck 704 is positioned with its mixer mouth 705 towards injector unit 104, lance 102 may be extended to reach into mixer 702 via mixer mouth 705, or be retracted out of mixer 702 via mixer mouth 705. One or more injectors (not shown in FIG. 1) are provided at the far end 105 of lance 102, for the combined injection of liquid nitrogen and liquid and/or solid carbon dioxide into mixer 702 towards free surface 706 of wet concrete 703, preferably with the option of also injecting only liquid nitrogen for part of the injection process.

Thus, when a concrete truck 704 arrives and is placed in position near vertical support structure 108, injector unit 104 is pivoted towards mouth 705 of the mixer 702 of the truck 704 and lance 102 is extended to reach inside mixer 702.

After completion of the cooling and partial carbonation of the wet concrete 703 in mixer 702, lance 102 is retracted from mixer 702 and injector unit 104 is pivoted away from mixer 702, so that truck 704 can leave without damaging either mixer 702 or injector unit 104.

Figure 2:
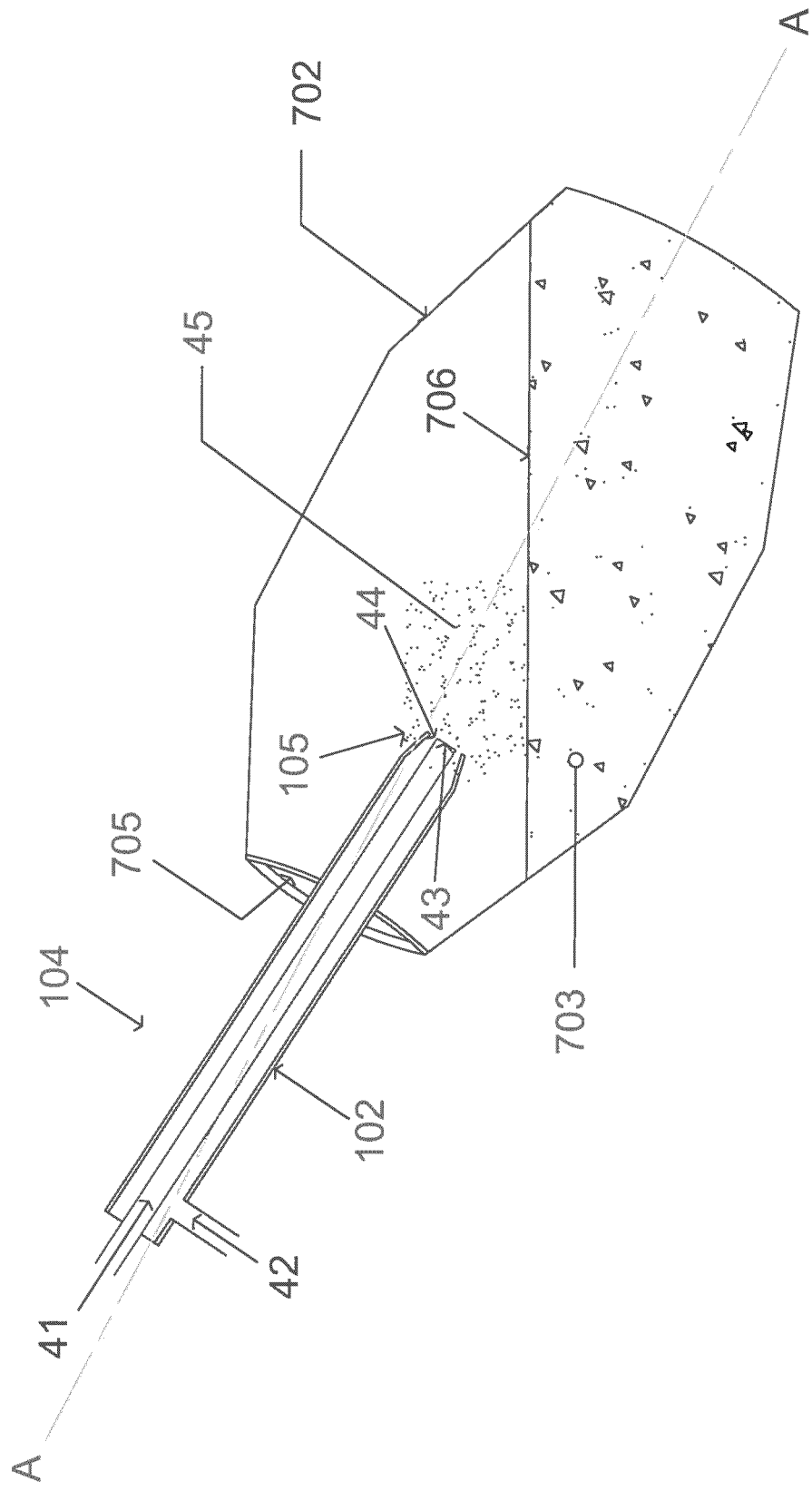
FIG. 2 is a schematic representation of an injector unit suitable for use in the installation of FIG. 1.

As illustrated in FIG. 2, according to one embodiment, the injector unit 104 may have a separate liquid-nitrogen inlet 41 and carbon-dioxide inlet 42. Liquid-nitrogen inlet 41 is fluidly connected to a source of liquid nitrogen (not shown) and carbon-dioxide inlet 42 is fluidly connected to a source of liquid and/or solid carbon dioxide (not shown). When the installation is used to simultaneously supply liquid nitrogen and solid and/or liquid carbon dioxide to mixer 702, liquid nitrogen flows in a controlled manner form the liquid-nitrogen source to liquid-nitrogen inlet 41 via a nitrogen conduit (not shown) and from said inlet 41 along lance 102 to far end 105 from which the liquid nitrogen is injected into mixer 702 so as to contact the free surface 706 of wet concrete 703. At the same time liquid and/or solid carbon dioxide flow in a likewise controlled manner from the carbon-dioxide source to carbon-dioxide inlet 42 via a carbon dioxide conduit (not shown) and from said inlet 42 along lance 102 to the far end 105 of lance 102 before being injected into mixer 702 in such a way that the carbon dioxide contacts the wet concrete 703 at its free surface 706. For example, the injection installation may comprise carbon-dioxide and nitrogen injectors 44, 43 in surrounding arrangement to one another so that when liquid nitrogen from the nitrogen source is supplied to the nitrogen injector 43 for injection into mixer 702 and carbon dioxide from the carbon-dioxide source is supplied in liquid form to the carbon-dioxide injector 44 for injection into mixer 702, the carbon dioxide and nitrogen are injected in contact with one another so that the liquid carbon dioxide solidifies and is entrained by the injected nitrogen towards fee surface 706 in the form of a spray of carbon dioxide particles/snow in and entrained by nitrogen 45.

When, during part of the process, only cooling with nitrogen is desired, only liquid nitrogen is supplied to the injection unit to injector unit 104, so that only nitrogen is injected into mixer 702, for example by means of nitrogen injector 43.

Figure 3:
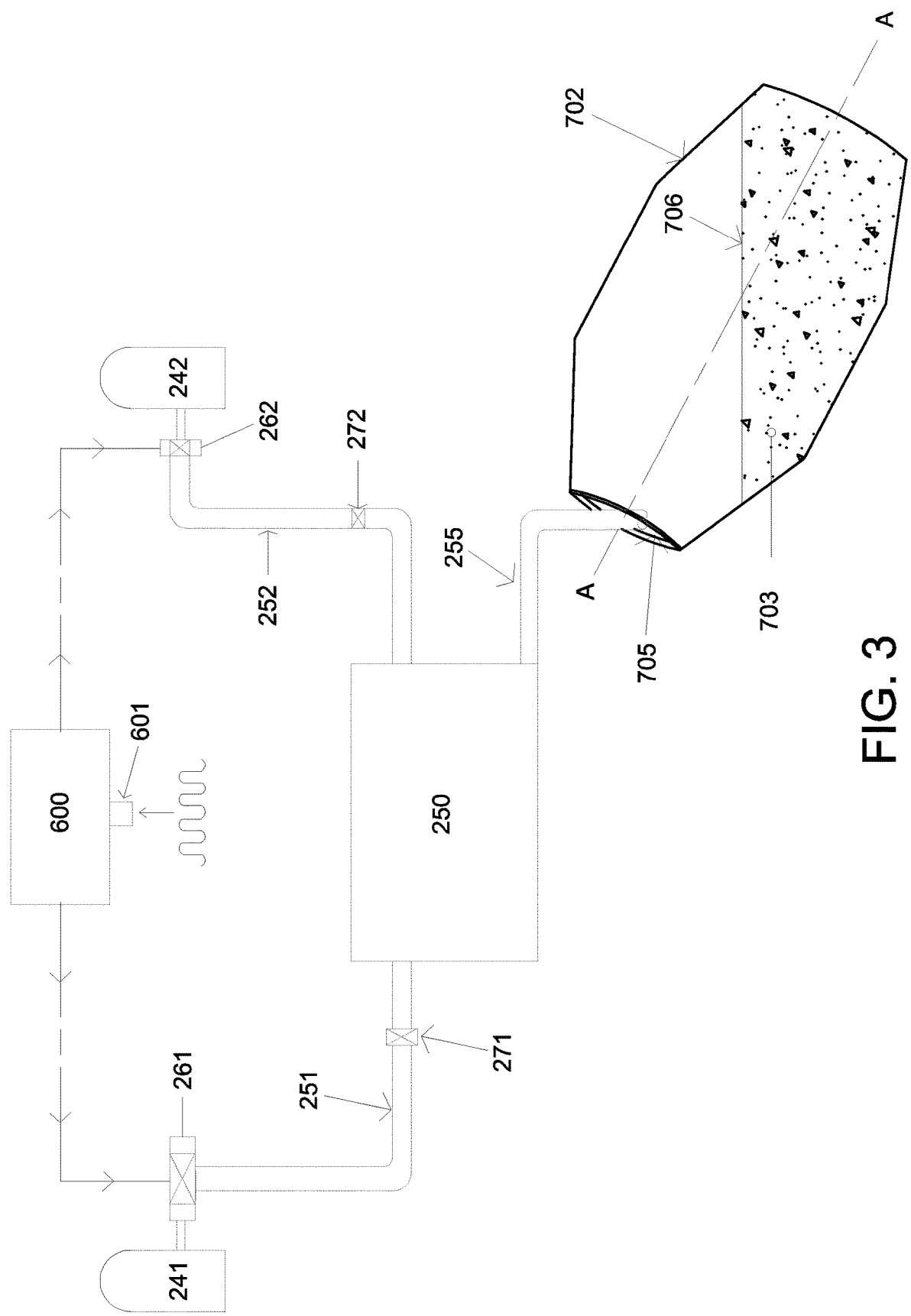
FIG. 3 is a schematic representation of an alternative installation for use in the present invention.

FIG. 3 illustrates an installation for use in the present invention, whereby liquid carbon dioxide is mixed with the liquid nitrogen before the resulting mixture is supplied to concrete mixer 702, via mouth 705, where it contacts free surface 706 of wet concrete 703.

Liquid nitrogen is stored on-site in cryogenic reservoir 241 and liquid carbon dioxide is stored in pressurized cryogenic reservoir 242. Nitrogen reservoir 241 is fluidly connected to blender 250 by means of nitrogen conduit 251 whereas carbon-dioxide reservoir 242 is fluidly connected to said blender 250 by means of carbon-dioxide conduit 252. Control valve 261 controls the amount and/or flow rate of liquid nitrogen from reservoir 241 to blender 250 and control valve 262 controls the amount and/or flow rate of liquid carbon dioxide from reservoir 242 to blender 250. No-return valves 271 and 272 ensure that no backflow can occur from blender 250 to respectively nitrogen reservoir 241 and carbon-dioxide reservoir 242.

Inside blender 250, carbon dioxide from reservoir 242 is mixed with liquid nitrogen from reservoir 241, in such a way that a suspension of solid carbon-dioxide particles is formed in the liquid nitrogen.

From blender 250, said suspension flows, via conduit 255 and mouth 705, into mixer 702 and onto free wet-concrete surface 706 inside mixer 702, where partial carbonation and cooling of wet concrete 705 takes place. In other words, conduit 251 and conduit 255 together form a 'nitrogen conduit' transporting liquid nitrogen from reservoir 241 to concrete mixer 702 and blender 250 constitutes a connector fluidly connecting carbon-dioxide reservoir to said 'nitrogen conduit' via carbon-dioxide conduit 252 and permitting the controlled addition of carbon dioxide to the nitrogen flow in the 'nitrogen conduit'.

Valves 251 and 252 are controlled by control unit 600.

When control unit 600 closes carbon-dioxide valve 262 while nitrogen valve 261 is open, a controlled amount/a controlled flow rate of liquid nitrogen is supplied to blender 250, without any carbon dioxide being supplied to said blender 250, only liquid nitrogen is supplied to mixer 702 and only cooling of wet concrete 705 takes place inside mixer 702.

Control unit 600 is itself preferably remotely controlled. For example, control unit 600 may be equipped with a data sensor 601 and concrete transport trucks 704 may be equipped with data emitters 602. Data emitters 602 transmit to data sensor 601 of control unit 600 information concerning the identification of truck 704, the nature and volume of wet concrete 705 contained in mixer 704, the degree of partial carbonation sought and information permitting to determine the degree of concrete cooling required. In addition, the installation may be equipped with a further sensor/emitter (not shown), in communication with data sensor 601 of control unit 600, said sensor/emitter being capable of detecting a positions of mixer 702 and mixer mouth 705 relative to the fluid supply equipment, in particular, in the case illustrated in FIG. 3, with respect to outlet opening of conduit 255, and, in the case illustrated in FIGS. 1 and 2, with respect to the outlet end 105 of lance 102. In this manner, it may be ensured that no flow of liquid nitrogen and solid and/or liquid carbon dioxide or of liquid nitrogen as such, as the case may be, is released until the corresponding outlets are correctly positioned inside mixer 702, and a safe working environment is assured around the installation and truck 704.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for conditioning wet concrete, comprising:
   (i) agitating wet concrete in a revolving-drum concrete mixer thereby bringing changing portions of the wet concrete to a free surface of the wet concrete inside the mixer, and
   (ii) cooling the agitated wet concrete in the concrete mixer by supplying nitrogen in liquid form to the mixer so that the supplied nitrogen contacts the wet concrete at the free surface and cools the wet concrete,
   wherein the agitated wet concrete is cooled and partially carbonated by supplying liquid and/or solid carbon dioxide to the concrete mixer simultaneously with the nitrogen so that both the supplied nitrogen and the supplied carbon dioxide contact the free surface of the wet concrete, the carbon dioxide comprising solid carbon dioxide,
   whereby the liquid and/or solid carbon dioxide is dispersed in the liquid nitrogen before the liquid nitrogen is supplied to the concrete mixer.

2. The method according to claim 1, whereby the wet concrete is cooled and partially carbonated:
   before transport of the wet concrete,
   between two transport stages of the wet concrete, or
   at a location where the wet concrete is subsequently cast to form a set concrete product.

3. A process for conditioning wet concrete, whereby during part of the process the wet concrete is cooled and partially carbonated by means of the method according to claim 1 and whereby during a different part of the process the wet concrete is cooled by supplying nitrogen in liquid form to the concrete mixer without carbon dioxide being supplied to the concrete mixer.

4. A method for conditioning wet concrete, comprising:
   (i) agitating wet concrete in a revolving-drum concrete mixer thereby bringing changing portions of the wet concrete to a free surface of the wet concrete inside the mixer, and
   (ii) cooling the agitated wet concrete in the concrete mixer by supplying nitrogen in liquid form to the mixer so that the supplied nitrogen contacts the wet concrete at the free surface and cools the wet concrete,
   wherein the agitated wet concrete is cooled and partially carbonated by supplying liquid and/or solid carbon dioxide to the concrete mixer simultaneously with the nitrogen so that both the supplied nitrogen and the supplied carbon dioxide contact the free surface of the wet concrete, the carbon dioxide comprising solid carbon dioxide,
   whereby the liquid nitrogen is supplied to a nitrogen injector, the nitrogen injector injecting said nitrogen into the concrete mixer in one or more nitrogen streams which contact the free surface and whereby the liquid and/or solid carbon dioxide is supplied to the mixer and dispersed in at least in at least one of the one or more injected nitrogen streams, the nitrogen being injected into the concrete mixer in a single nitrogen stream.

5. The method according to claim 4, whereby the wet concrete is cooled and partially carbonated:
   before transport of the wet concrete,
   between two transport stages of the wet concrete, or
   at a location where the wet concrete is subsequently cast to form a set concrete product.

6. A process for conditioning wet concrete, whereby during part of the process the wet concrete is cooled and partially carbonated by means of the method according to claim 4 and whereby during a different part of the process the wet concrete is cooled by supplying nitrogen in liquid form to the concrete mixer without carbon dioxide being supplied to the concrete mixer.

7. A method for conditioning wet concrete, comprising:
   (i) agitating wet concrete in a revolving-drum concrete mixer thereby bringing changing portions of the wet concrete to a free surface of the wet concrete inside the mixer, and
   (ii) cooling the agitated wet concrete in the concrete mixer by supplying nitrogen in liquid form to the mixer so that the supplied nitrogen contacts the wet concrete at the free surface and cools the wet concrete,
   wherein the agitated wet concrete is cooled and partially carbonated by supplying liquid and/or solid carbon dioxide to the concrete mixer simultaneously with the nitrogen so that both the supplied nitrogen and the supplied carbon dioxide contact the free surface of the wet concrete, the carbon dioxide comprising solid carbon dioxide,
   whereby the one or more carbon-dioxide streams or at least one of the one or more carbon-dioxide streams are/is injected into the concrete mixer in contact with at least one of the one or more nitrogen streams.

8. The method according to claim 7, whereby the wet concrete is cooled and partially carbonated:
   before transport of the wet concrete,
   between two transport stages of the wet concrete, or
   at a location where the wet concrete is subsequently cast to form a set concrete product.

9. A process for conditioning wet concrete, whereby during part of the process the wet concrete is cooled and partially carbonated by means of the method according to claim 7 and whereby during a different part of the process the wet concrete is cooled by supplying nitrogen in liquid form to the concrete mixer without carbon dioxide being supplied to the concrete mixer.

* * * * *